United States Patent [19]
Forsyth

[11] Patent Number: 6,023,987
[45] Date of Patent: Feb. 15, 2000

[54] SIX-SPEED MANUAL TRANSAXLE

[75] Inventor: John R. Forsyth, Romeo, Mich.

[73] Assignee: New Venture Gear, Inc., Troy, Mich.

[21] Appl. No.: 09/044,415

[22] Filed: Mar. 19, 1998

[51] Int. Cl.⁷ .................................................. F16H 57/00
[52] U.S. Cl. .............................................. 74/331; 74/325
[58] Field of Search ............................ 74/325, 330, 331, 74/333

[56] References Cited

U.S. PATENT DOCUMENTS

| | | |
|---|---|---|
| 4,565,106 | 1/1986 | Sumlyoshi . |
| 4,570,503 | 2/1986 | Theobald ............................... 74/331 X |
| 4,576,063 | 3/1986 | Akashi et al. ......................... 74/331 X |
| 5,044,215 | 9/1991 | Watanabe . |
| 5,184,522 | 2/1993 | Nordvkist ............................... 74/331 X |
| 5,311,789 | 5/1994 | Henzler et al. . |
| 5,353,661 | 10/1994 | Ordo ......................................... 74/331 |
| 5,385,065 | 1/1995 | Hofmann ................................. 74/331 |
| 5,495,775 | 3/1996 | Lees et al. ................................ 74/331 |
| 5,593,358 | 1/1997 | Frost . |
| 5,697,250 | 12/1997 | Ahluwalia et al. . |
| 5,704,247 | 1/1998 | Ahluwalia et al. . |
| 5,715,727 | 2/1998 | Janiszewski ........................... 74/330 X |
| 5,722,291 | 3/1998 | Fraley et al. . |
| 5,735,175 | 4/1998 | Forsyth . |
| 5,799,536 | 9/1998 | Janiszewski et al. ..................... 74/331 |

*Primary Examiner*—Khoi Q. Ta
*Attorney, Agent, or Firm*—Harness, Dickey & Pierce, P.L.C.

[57] ABSTRACT

The present invention is directed to a six-speed manual transmission comprised of an input shaft, an output shaft, first and second input gears fixed to the input shaft in mesh with first and second speed gears rotatably supported on the output shaft, third and fourth input gears rotatably supported on the input shaft, an output gear rotatably supported on the output shaft and having a third speed gear meshed with the third input gear and a fourth speed gear meshed with the fourth input gear, a first transfer gear meshed with the fourth speed gear, a second transfer gear, a third transfer gear fixed to the output shaft and meshed with the second transfer gear, a first clutch for selectively coupling either of the first and second speed gears to the output shaft, a second clutch for selectively coupling either of the third and fourth input gears to the input shaft, a third clutch for selectively coupling the first transfer gear to the second transfer gear, and a fourth clutch for selectively coupling the output gear to the output shaft.

21 Claims, 4 Drawing Sheets

6,023,987

SIX-SPEED MANUAL TRANSAXLE

BACKGROUND OF THE INVENTION

This invention relates generally to multi-speed transmissions of the type used in motor vehicles. More specifically, the present invention is directed to a compact six-speed manual transaxle.

Due to increasing consumer demand for front wheel drive vehicles with more powerful yet fuel-efficient drivetrains, the engine and transaxle must be efficiently packaged to take advantage of all available space within the engine compartment. Concomitantly, most modern transaxles must be capable of providing at least forward five speed ratios. In this regard, many transaxles are currently being developed to provide six forward speed ratios. As such, minimizing the overall axial length of the transaxle as well as its shaft center distances is of critical importance to the transmission designer. To meet these requirements, various "three-shaft" type transaxles have been developed that include an input shaft and a pair of output shafts each having an output pinion meshed with a drive gear fixed to the differential case. A series of gearsets provided between the input shaft and one or both of the output shafts can be selectively engaged to deliver power from the input shaft to the differential case to drive a pair of axle half-shafts. For example, U.S. Pat. Nos. 5,311,789, 5,385,065 and U.S. Pat. No. 5,495,775 each disclose this type of transaxle.

A design constraint associated with this type of transaxle relates to the requirement that both of the output shafts be positioned "out-of-plane" relative to the plane extending through the input shaft and the differential. In particular, in order to maintain the center distance between the input shaft and the differential required for adequate driveshaft clearance, the transaxle's input shaft/output shaft center distance and its output shaft/differential center distance must be increased. This results in added geartrain mass and cost while also requiring increased synchronizer capacity.

Accordingly, while such conventional manual transaxle designs attempt to address the packaging requirements mentioned above, a need still exists for development of more compact and robust manual transaxles that can meet the demands of modern front wheel drive vehicular applications.

SUMMARY OF THE INVENTION

The primary object of the present invention is to provide a multi-speed manual transaxle that meets the above-noted needs and improves upon conventional designs. To this end, the present invention is directed to a manual transmission comprised of an input shaft, an output shaft, first and second input gears rotatably supported on the input shaft, an output gear rotatably supported on the output shaft and having a first speed gear meshed with the first input gear and a second speed gear meshed with the second input gear, a first transfer gear meshed with the second speed gear, a second transfer gear, a third transfer gear fixed to the output shaft and meshed with the second transfer gear, a first clutch for selectively coupling either of the first and second input gears to the input shaft, a second clutch for selectively coupling the first transfer gear to the second transfer gear, and a third clutch for selectively coupling the output gear to the output shaft.

In accordance with an alternative arrangement, the transmission of the present invention includes an input shaft, an output shaft, an intermediate shaft, first and second input gears rotatably supported on the input shaft, an output gear rotatably supported on the output shaft and having a first speed gear meshed with the first input gear and a second speed gear meshed with the second input gear, a first transfer gear fixed to said intermediate shaft and meshed with said second speed gear, a second transfer gear fixed to the intermediate shaft, a third transfer gear rotatably supported on the output shaft and meshed with the second transfer gear, a first clutch for selectively coupling either of the first and second input gears to the input shaft, and a second clutch for selectively coupling either of the third transfer gear and the output gear to said output shaft.

BRIEF DESCRIPTION OF THE DRAWINGS

Further objects, features and advantages of the present invention will become apparent to those skilled in the art from studying the following description and the accompanying drawings in which.

DETAILED DESCRIPTION OF THE PREFERRED EMBODIMENTS

Figure 1:
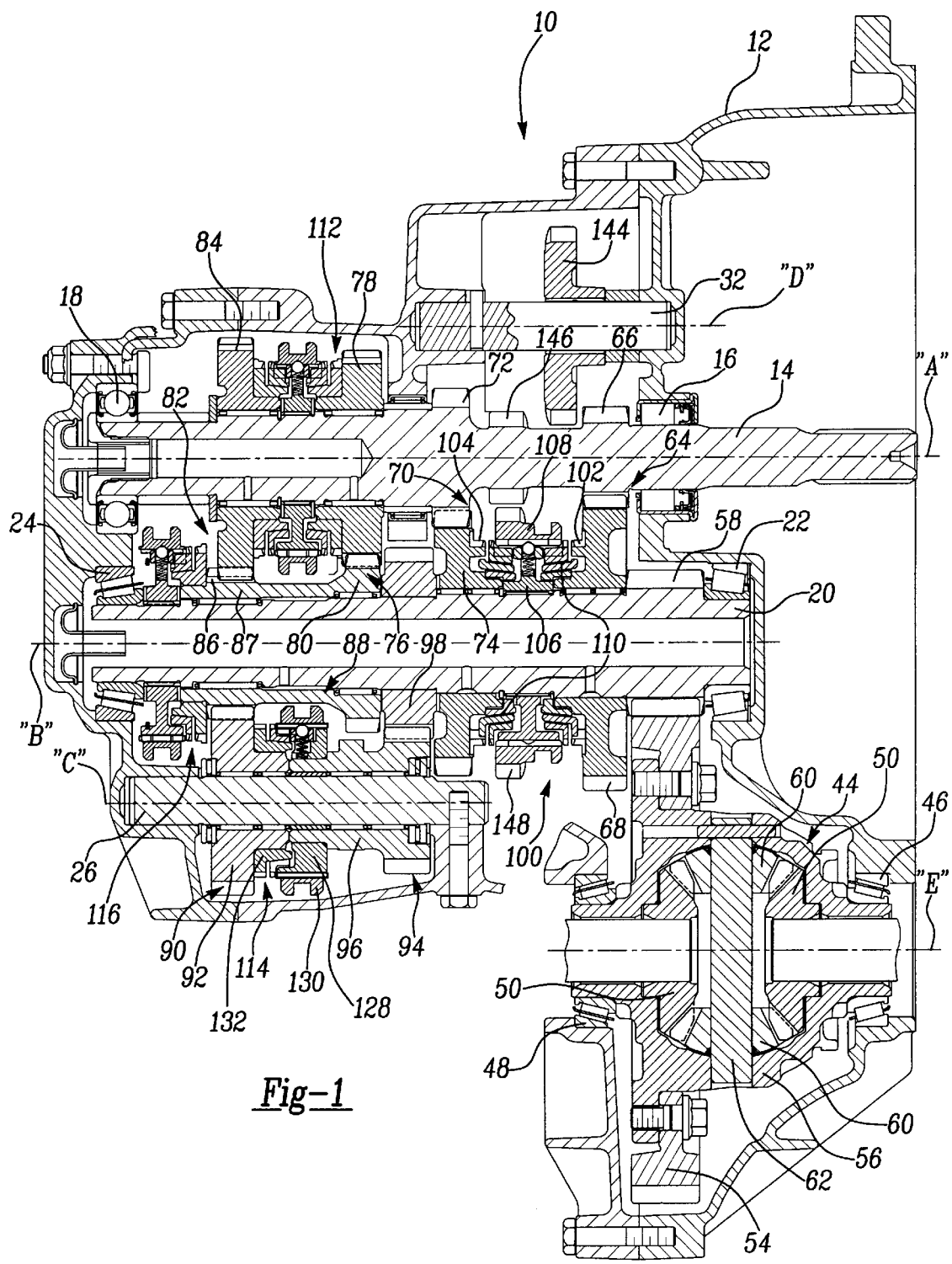
FIG. 1 is a sectional view of a six-speed manual transaxle according to a preferred embodiment of the present invention.

Referring now to the drawings, a manual transaxle 10 is shown that is adapted for use in front wheel drive motor vehicles. Transaxle 10 is a multi-speed arrangement having all of its forward gears synchronized and yet is efficiently packaged to provide a compact gearbox.

Transaxle 10 is shown to include a housing 12 within which an input shaft 14 is rotatably supported by bearings 16 and 18 for rotation about a first axis "A". As is conventional, input shaft 14 is adapted to be driven through a suitable manually-released clutch (not shown) by the vehicle's engine. An output shaft 20 is rotatably supported in housing 12 by bearings 22 and 24 for rotation about a second axis "B". In addition, transaxle 10 includes an intermediate shaft 26 mounted to housing 12 and which defines a third axis "C". A reverse idler shaft 32 is mounted in housing 12 and defines a fourth axis "D". Finally, a differential assembly 44 is supported in housing 12 by bearings 46 and 48 for rotation about a fifth axis "E". The output of differential assembly 44 includes a pair of axially aligned side gears 50 to which axle half-shafts 52 are fixed in a conventional manner so as to connect differential assembly 44 to the left and right driving wheels of the motor vehicle. The input to differential assembly 44 is a drive gear 54 that is fixed to a differential casing 56 and which is in constant meshed engagement with an output gear 58 fixed to output shaft 20. A pair of pinion gears 60 mesh with side gears 50 and are rotatably supported on a cross pin 62 which has its opposite ends fixed to casing 56. It will be appreciated that FIG. 1 is a so-called "unrolled" sectional views wherein shafts 14, 20, 26, 32 and 52 are all shown to be arranged in a single plane. However, in reality, these shafts are compactly arranged in a parallel relationship relative to each other, with the rotary axes for shafts 14, 20 and 52 aligned in a common plane. In addition, intermediate shaft 26 and reverse idler shaft 32 are shown in FIG. 1 to be rotated out of position to illustrate the various components associated therewith. Since output shaft 20 is located in a common plane with input shaft 14 and differential assembly 44, the center distances between these shafts can be effectively minimized.

Transaxle 10 includes a series of constant-mesh gearsets that can be selectively engaged for establishing six forward speed ratios as well as a reverse speed ratio between input shaft 14 and output shaft 20. In this regard, gearset 64 includes a first input gear 66 fixed to input shaft 14 that is in constant mesh with a first speed gear 68 rotatably supported on output shaft 20. Gearset 70 includes a second input gear 72 fixed to input shaft 14 that is in constant mesh with a second speed gear 74 rotatably supported on output shaft 20. Gearset 76 includes a third input gear 78 rotatably supported on input shaft 14 that is in constant mesh with a third speed gear 80 rotatably supported on output shaft 20. Gearset 82 includes a fourth input gear 84 rotatably supported on input shaft 14 that is in constant mesh with a fourth speed gear 86 rotatably supported on output shaft 20. As seen, third speed gear 80 and fourth speed gear 86 are fixed to, or are integrally formed on a stub shaft 87 so as to define a combination output gear 88. Gearset 90 includes a first transfer gear 92 rotatably supported on intermediate shaft 26 that is in constant mesh with fourth speed gear 86. Gearset 94 includes a second transfer gear 96 rotatably supported on intermediate shaft 26 that is in constant mesh with a third transfer gear 98 fixed to output shaft 20.

To provide means for establishing the various forward and reverse speed ratios between input shaft 14 and output shaft 20, a set of selectively engageable clutches are provided. In particular, a first synchronizer clutch 100 is operably located on output shaft 20 between first speed gear 68 and second speed gear 74. First synchronizer clutch 100 includes a clutch ring 102 fixed to first speed gear 68, a clutch ring 104 fixed to second speed gear 74, a hub 106 fixed to output shaft 20, a shift sleeve 108 splined for rotation with and axial sliding movement on hub 106, and a pair of synchronizers 110 operably disposed between shift sleeve 108 and clutch rings 102 and 104. First synchronizer clutch 100 is double-acting such that forward axial movement of shift sleeve 108 from its centered neutral position shown into a position of engagement with clutch ring 102 acts to releasably couple first speed gear 68 to output shaft 20. As such, rotary power (i.e., drive torque) is transferred from input shaft 14 to output shaft 20 through first input gear 66, first speed gear 68, clutch ring 102, shift sleeve 108 and hub 106, thereby establishing a first forward speed ratio. Moreover, rearward axial movement of shift sleeve 108 from its neutral position into a position of engagement with clutch ring 104 acts to releasably couple second speed gear 74 to output shaft 20. Thus, rotary power is transferred from input shaft 14 to output shaft 20 through second input gear 72, second speed gear 74, clutch ring 104, shift sleeve 108 and hub 106, thereby establishing a second forward speed ratio.

Transaxle 10 is shown to also include a second synchronizer clutch 112, a third synchronizer clutch 114, and a fourth synchronizer clutch 116. Second synchronizer clutch 112 is located on input shaft 14 and is operable for selectively coupling third input gear 78 and fourth input gear 84 to input shaft 14. Third synchronizer clutch 114 is located on intermediate shaft 26 and is operable for selectively coupling first transfer gear 92 to second transfer gear 96, thereby establishing a first drive connection or first power path between output gear 88 and output shaft 20. Finally, fourth synchronizer clutch 116 is located on output shaft 20 and is operable for selectively coupling output gear 88 directly to output shaft 20, thereby establishing a second drive connection or second power path therebetween.

Second synchronizer clutch 112 includes a hub 118 fixed to input shaft 14, a clutch ring 120 fixed to third input gear 78, a clutch ring 122 fixed to fourth input gear 84, a shift sleeve 124 splined for rotation with and axial movement on hub 118, and a pair of synchronizers 126 operably disposed between shift sleeve 124 and clutch rings 120 and 122. Forward axial movement of shift sleeve 124 from its centered neutral position shown to a position of engagement with clutch ring 120 acts to releasably couple third input gear 78 to input shaft 14. Likewise, rearward axial movement of shift sleeve 124 from its neutral position to a position of engagement with clutch ring 122 acts to releasably couple fourth input gear 84 to input shaft 14. Third synchronizer clutch 114 includes a hub 128 fixed to second transfer gear 96, a shift sleeve 130 splined for rotation with and axial movement on hub 128, a clutch ring 132 fixed to first transfer gear 92, and a synchronizer 134 operably disposed between shift sleeve 130 and clutch ring 132. When shift sleeve 130 is in the disengaged position (shown in FIG. 1), first transfer gear 92 is free to rotate relative to second transfer gear 96. In contrast, rearward axial movement of shift sleeve 130 from its disengaged position to the engaged position (shown in FIG. 2) causes first transfer gear 92 to be releasably coupled to second transfer gear 96. Finally, fourth synchronizer clutch 116 includes a clutch ring 136 fixed to stub shaft 86 of output gear 88, a hub 138 fixed to output shaft 20, a shift sleeve 140 splined for rotation with and axial sliding movement on hub 138, and a synchronizer 142 operably disposed between shift sleeve 140 and clutch ring 136. When shift sleeve 140 is in the disengaged position (shown in FIG. 1), output gear 88 is free to rotate relative to output shaft 20. In contrast, forward axial movement of shift sleeve 140 to the engaged position (shown in FIG. 3) causes output gear 88 to be releasably coupled directly to output shaft 20.

Figure 2:
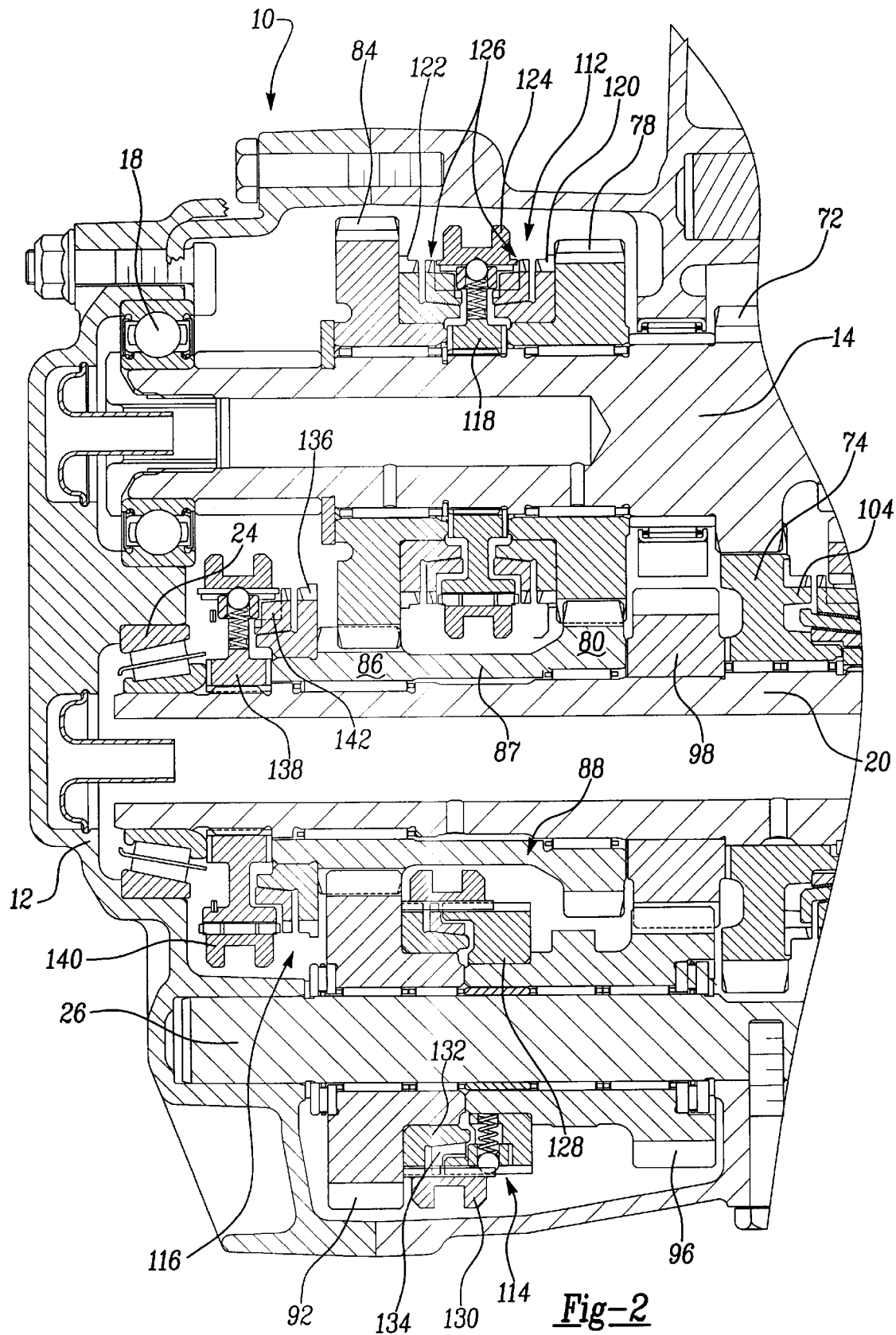
FIGS. 2 and 3 are enlarged partial views of the transaxle shown in FIG. 1.

As best seen from FIG. 2, when it is desired to establish the third and fourth forward speed ratios, shift sleeve 130 is located in its engaged position and shift sleeve 140 is located in its disengaged position, thereby connecting the first torque path between output gear 88 and output shaft 20. Thereafter, second synchronizer clutch 112 is actuated to cause forward movement of shift sleeve 124 from its neutral position into its position of engagement with clutch ring 120 which, as previously noted, releasably couples third input gear 78 to input shaft 14. In this position, rotary power is transferred from input shaft 14 to output shaft 20 through hub 118, shift sleeve 124, clutch ring 120, third input gear 78, third speed gear 80, fourth speed gear 86, first transfer gear 92, clutch ring 132, shift sleeve 130, hub 128, second transfer gear 96, and third transfer gear 98, thereby establishing the third forward speed ratio. Similarly, rearward movement of shift sleeve 124 from its neutral position into its position of engagement with clutch ring 122 releasably couples fourth input gear 84 to input shaft 14. In this position, rotary power is transferred from input shaft 14 to output shaft 20 through hub 118, shift sleeve 124, clutch ring 122, fourth input gear 84, fourth speed gear 86, first transfer gear 92, clutch ring 132, shift sleeve 130, hub 128, second transfer gear 96, and third transfer gear 98, thereby establishing the fourth forward speed ratio.

Figure 3:
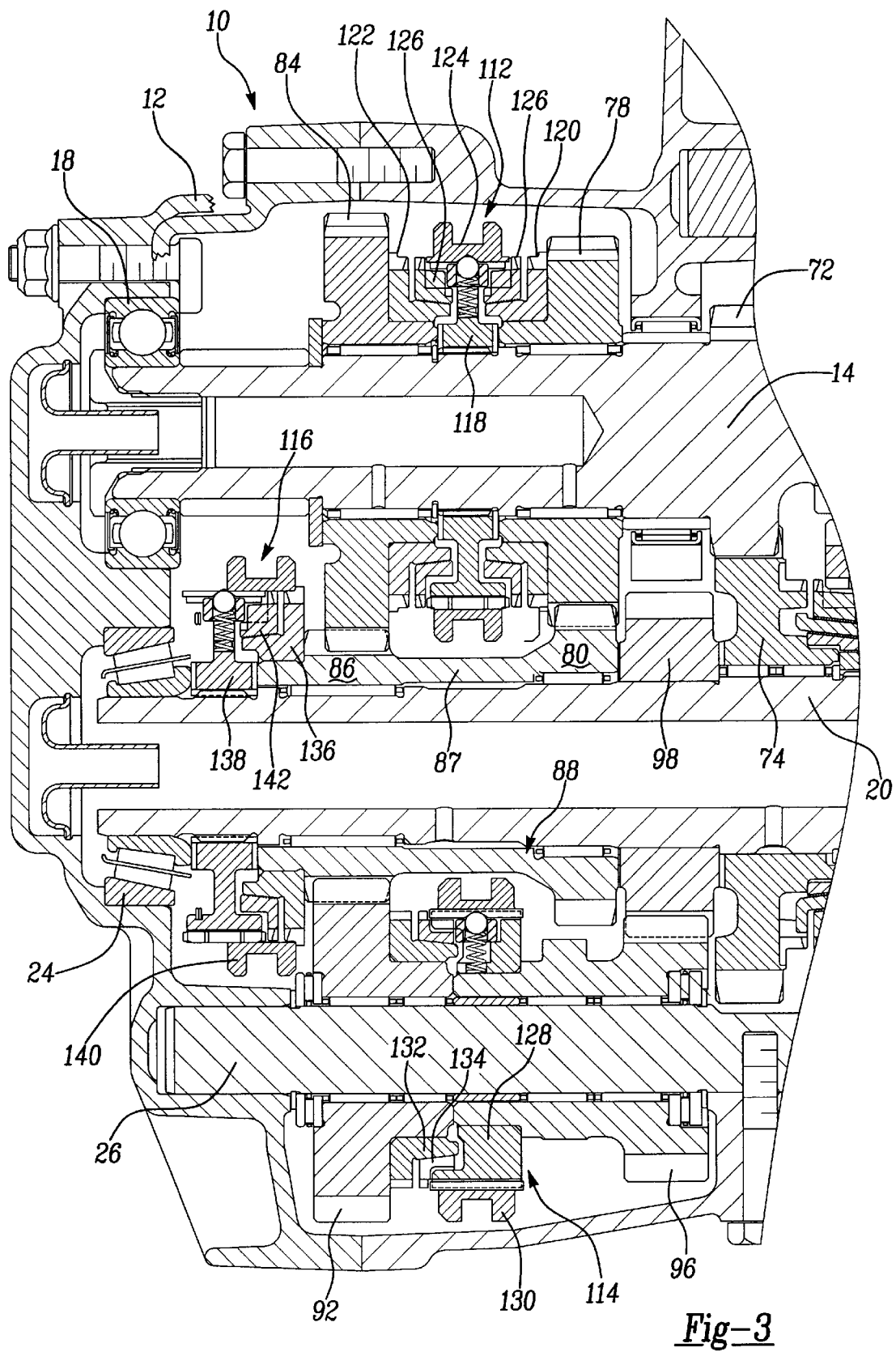

As best seen from FIG. 3, when it is desired to establish the fifth and sixth forward speed ratios, shift sleeve 130 is located in its disengaged position and shift sleeve 140 is located in its engaged position, thereby connecting the second torque path between output gear 88 and output shaft 20. To establish the fifth forward speed ratio, second synchronizer clutch 112 is actuated to cause forward movement of shift sleeve 124 from its neutral position into its position of engagement with clutch ring 120 which, as previously noted, releasably couples third input gear 78 to input shaft 14. In this position, rotary power is transferred from input shaft 14 to output shaft 20 through hub 118, shift sleeve 124, clutch ring 120, third input gear 78, third speed gear 80, fourth speed gear 86, clutch ring 136, shift sleeve 140 and hub 138, thereby establishing the fifth forward speed ratio. Similarly, rearward movement of shift sleeve 124 from its neutral position into its position of engagement with clutch ring 122 releasably couples fourth input gear 84 to input shaft 14. Thus, rotary power is transferred from input shaft 14 to output shaft 20 through hub 118, shift sleeve 124, clutch ring 122, fourth input gear 84, fourth speed gear 86, clutch ring 136, shift sleeve 140 and hub 138, thereby establishing the sixth forward speed ratio.

To establish the reverse speed ratio, an idler gear 144 rotatably supported on idler shaft 32 is moved from the disengaged position shown in FIG. 1 to an engaged position whereat idler gear 144 is meshed with a reverse input gear 146 fixed to input shaft 14 and with a reverse output gear 148 fixed to shift sleeve 108. Thus, rotary power is transferred from input shaft 14 to output shaft 20 through reverse input gear 146, idler gear 144, reverse output gear 148, shift sleeve 108, and hub 106.

In view of the above, the present invention teaches of an arrangement for providing two distinct power (i.e., torque) paths that can be selectively established for permitting subsequent engagement of a single gearset to establish two distinct speed ratios. Specifically, one bidirectional dog clutch can be used in a first position to establish two different speed ratios (i.e., 3rd and 5th) and in a second position to establish two additional different speed ratios (i.e., 4th and 6th) dependent on which torque path is engaged.

As the terms are used herein, all components "rotatably supported" on another component are journalled or mounted thereon using suitable bearings while all components "fixed" to another component are non-rotatively mounted thereon via any conventional means (i.e., splines, press-fit, welding, etc.) or are integrally formed thereon. Moreover, it is contemplated that any shift system operable for coupling each of movable shift sleeves 108, 124, 130 and 140 and idler gear 144 to a gearshift lever and coordinating movement therebetween for establishing the various forward and reverse speed ratios can be used in association with transaxle 10. Alternatively, axial movement of shift sleeves 130 and 140 could be made by separate power-operated (i.e., electric or hydraulic) actuators in response to the gearshift lever moving between the 3–4 and 5–6 gates. Finally, if transfer gears 92 and 96, when engaged via third synchronizer clutch 114, provide a reduction drive arrangement (i.e., a reduction gearset), then the above-noted speed ratios are sequential. However, if transfer gears 92 and 96 provide a multiplier drive arrangement (i.e., an overdrive gearset), the third and fourth speed ratios would be established when shift sleeve 140 engages output gear 88 and the fifth and sixth speed ratios would be established when shift sleeve 130 engages transfer gear 92.

Figure 4:
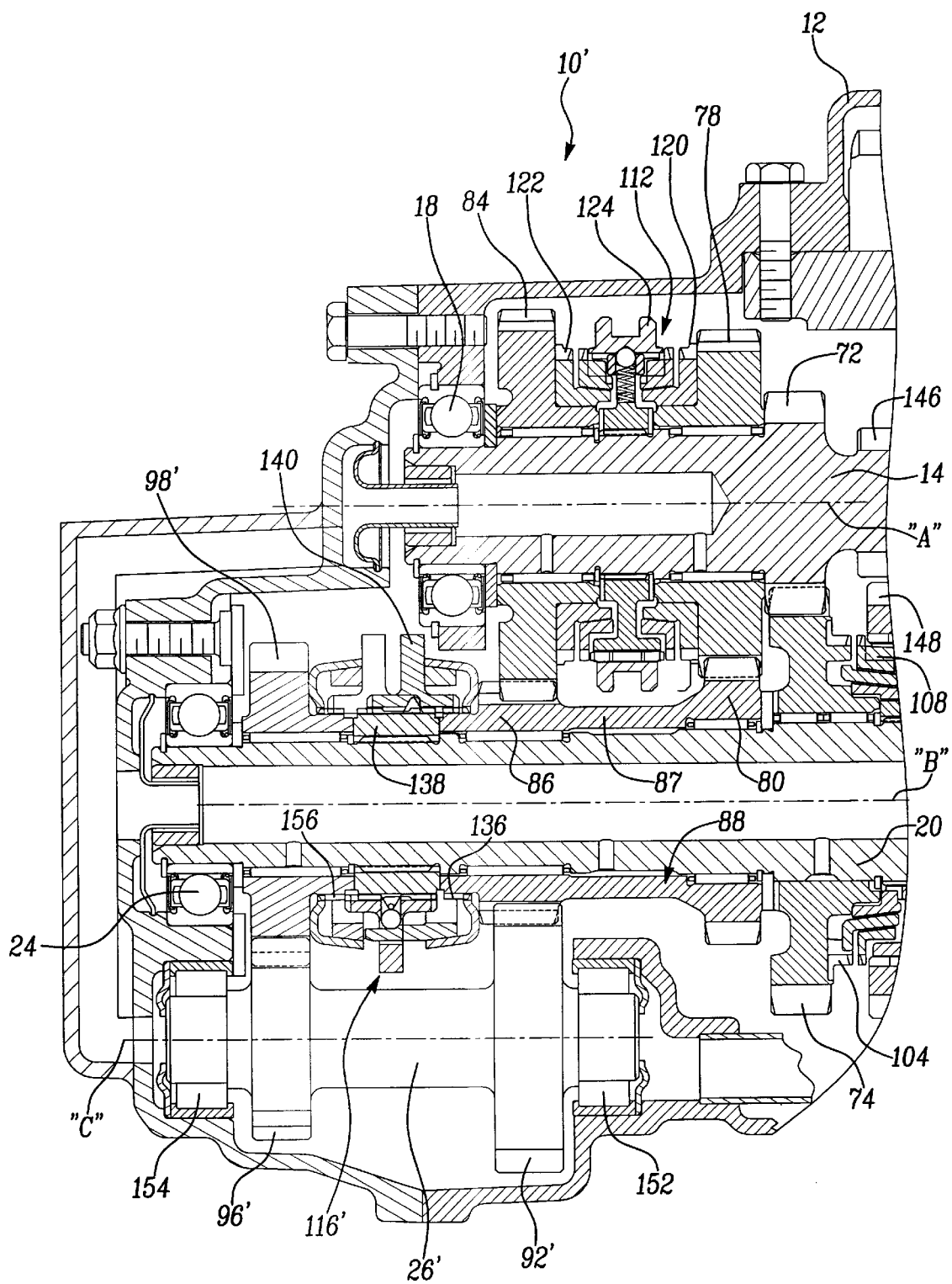
FIG. 4 is a partial sectional view of a six-speed manual transaxle according to an alternative preferred embodiment of the present invention.

Referring now to FIG. 4, a modified version of transaxle 10, hereinafter referred to as transaxle 10', is shown. In general, the geartrain of transaxle 10' is similar in function to that of transaxle 10 but includes a modified arrangement for selectively engaging the two distinct torque paths available between output gear 88 and output shaft 20, each of which can be selectively connected by synchronizer clutch 112 to third input gear 68 and fourth input gear 84. Due to the commonality of many of the components associated with transaxles 10 and 10', similar components are identified by like reference numbers while modified components are identified by primed reference numbers. As will be detailed, third synchronizer clutch 114 is not used in transaxle 10' since fourth synchronizer clutch 116' is now double-acting for selectively coupling third transfer gear 98' to output shaft 20 in addition to selectively coupling output gear 88 thereto.

Third transfer gear 98' is shown rotatably supported on output shaft 20 adjacent to hub 138. In addition, and first transfer gear 92' and second transfer gear 96' are shown fixed to intermediate shaft 26' which is rotatably supported from housing 12 by bearings 152 and 154. First transfer gear 92' is meshed with fourth speed gear 86 of output gear 88 and second transfer gear 96' is meshed with third transfer gear 98'. Synchronizer clutch 116' is double-acting such that shift sleeve 140 is movable on hub 138 from the neutral position (shown below axis "B" in FIG. 4) in a rearward direction to engage a clutch ring 156 fixed to third transfer gear 98' and in a forward direction to engage clutch ring 136 fixed to output gear 88. When shift sleeve 140 is in its position of engagement with clutch ring 156 (shown in phantom above axis "B" in FIG. 4), the first torque path is connected such that the drive torque delivered to fourth speed gear 86 from input shaft 14 through either of input gears 78 and 84 (via shift sleeve 124) is then transferred to output shaft 20 through first transfer gear 92', second transfer gear 96', third transfer gear 98', clutch ring 156, shift sleeve 140 and hub 138. Conversely, when shift sleeve 140 is in its position of engagement with clutch ring 136 (shown about axis "B" in FIG. 4), the second torque path is connected such that the drive torque delivered to fourth speed gear 86 from input shaft 14 through either of input gears 78 and 84 (via shift sleeve 124) is then transferred directly to output shaft 20 through clutch ring 136, shift sleeve 140 and hub 138. Thus, synchronizer clutch 116' is operable in a first mode to establish the third and fourth speed ratios when shift sleeve 140 is coupled to third transfer gear 98' and is operable in a second mode to establish the fifth and sixth speed ratios when shift sleeve 140 is coupled to output gear 88. As mentioned, if transfer gears 92' and 96' establish an overdrive gearset rather than an underdrive gearset, then the third and fourth speed ratios would be established when shift sleeve 140 is coupled to output gear 88 and the fifth and sixth speed ratios would be established when shift sleeve 140 is coupled to third transfer gear 98'.

The foregoing discussion discloses and describes preferred embodiments of the present invention. One skilled in the art will readily recognize from such discussion, and from the accompanying drawings and claims, that various changes, modifications and variations can be made therein without departing from the true spirit and fair scope of the invention as defined in the following claims. For example, the novel geartrain arrangements disclosed herein for use in the transaxles may likewise be used in a rear-wheel drive transmission wherein the differential would be removed and the output shaft would extend rearwardly for connection to the vehicle's rear driveline components.

What is claimed is:

1. A manual transmission comprising:
   an input shaft;
   an output shaft;
   first and second input gears rotatably supported on said input shaft;
   an output gear rotatably supported on said output shaft and having a first speed gear meshed with said first input gear and a second speed gear meshed with said second input gear;
   a first transfer gear meshed with said second speed gear;
   a second transfer gear;

a third transfer gear fixed to said output shaft and meshed with said second transfer gear;

a first clutch for selectively coupling either of said first and second input gears to said input shaft;

a second clutch for selectively coupling said first transfer gear to said second transfer gear; and a third clutch for selectively coupling said output gear to said output shaft.

2. The manual transmission of claim 1 wherein said first and second transfer gears are rotatably supported on an intermediate shaft.

3. The manual transmission of claim 1 further comprising a differential driven by said output shaft.

4. The manual transmission of claim 1 wherein said first clutch includes a first shift sleeve mounted for rotation with said input shaft and movable between first, second, and third positions, said first shift sleeve is operable in said first position to uncouple said first and second input gears from said input shaft, said first shift sleeve is operable in said second position to couple said first input gear to said input shaft, and said first shift sleeve is operable in said third position to couple said second input gear to said input shaft.

5. The manual transmission of claim 4 wherein said first shift sleeve is operable in said second position to establish a drive connection at a first speed ratio between said input shaft and said output shaft when said second clutch couples said first transfer gear to said second transfer gear, said first shift sleeve is operable in said third position to establish a drive connection at a second speed ratio between said input shaft and said output shaft when said second clutch couples said first transfer gear to said second transfer gear, said first shift sleeve is operable in said second position to establish a drive connection at a third speed ratio between said input shaft and said output shaft when said third clutch couples said output gear to said output shaft, and said first shift sleeve is operable in said third position to establish a drive connection at a fourth speed ratio between said input shaft and said output shaft when said third clutch couples said output gear to said output shaft.

6. The manual transmission of claim 5 wherein said first and second speed ratios are higher than said third and fourth speed ratios.

7. The manual transmission of claim 4 wherein said first clutch further includes synchronizers disposed between said first shift sleeve and said first and second input gears.

8. The manual transmission of claim 4 wherein said second clutch includes a second shift sleeve mounted for rotation with one of said first and second transfer gears and movement between a first position disengaged from the other of said first and second transfer gears to permit relative rotation therebetween and a second position engaged with said other of said first and second transfer gears to inhibit relative rotation therebetween.

9. The manual transmission of claim 8 wherein said third clutch includes a third shift sleeve mounted for rotation with said output shaft and movement between a first position disengaged from said output gear to permit relative rotation therebetween and a second position engaged with said output gear to inhibit relative rotation therebetween.

10. A manual transmission comprising:

an input shaft;

an output shaft;

an intermediate shaft;

first and second input gears rotatably supported on said input shaft;

an output gear rotatably supported on said output shaft and having a first speed gear meshed with said first input gear and a second speed gear meshed with said second input gear;

a first transfer gear fixed to said intermediate shaft and meshed with said second speed gear;

a second transfer gear fixed to said intermediate shaft;

a third transfer gear rotatably supported on said output shaft and meshed with said second transfer gear;

a first clutch for selectively coupling either of said first and second input gears to said input shaft; and a second clutch for selectively coupling either of said third transfer gear and said output gear to said output shaft.

11. The manual transmission of claim 10 further comprising a differential driven by said output shaft.

12. The manual transmission of claim 10 wherein said first clutch includes a first shift sleeve mounted for rotation with said input shaft and movable between first, second, and third positions, said first shift sleeve is operable in said first position to uncouple said first and second input gears from said input shaft, said first shift sleeve is operable in said second position to couple said first input gear to said input shaft, and said first shift sleeve is operable in said third position to couple said second input gear to said input shaft.

13. The manual transmission of claim 12 wherein said first shift sleeve is operable in said second position to establish a drive connection at a first speed ratio between said input shaft and said output shaft when said second clutch couples said third transfer gear to said output shaft, said first shift sleeve is operable in said third position to establish a drive connection at a second speed ratio between said input shaft and said output shaft when said second clutch couples said third transfer gear to said output shaft, said first shift sleeve is operable in said second position to establish a drive connection at a third speed ratio between said input shaft and said output shaft when said third clutch couples said output gear to said output shaft, and said first shift sleeve is operable in said third position to establish a drive connection at a fourth speed ratio between said input shaft and said output shaft when said third clutch couples said output gear to said output shaft.

14. The manual transmission of claim 13 wherein said first and second speed ratios are higher than said third and fourth speed ratios.

15. The manual transmission of claim 12 wherein said first clutch further includes synchronizers disposed between said first shift sleeve and said first and second input gears.

16. The manual transmission of claim 15 wherein said second clutch includes a second shift sleeve mounted for rotation with said output shaft and movement between first, second and third positions, said second shift sleeve is operable in said first position to uncouple said third transfer gear and said output gear from said output shaft, said second shift sleeve is operable in said second position to couple said third transfer gear for rotation with said output shaft, and said second shift sleeve is operable in said third position to couple said output gear for rotation with said output shaft.

17. The manual transmission of claim 16 further comprising synchronizers disposed between said second shift sleeve and said third transfer gear and said output gear.

18. A manual transmission comprising:

an input shaft;

an output shaft;

first and second input gears rotatably supported on said input shaft;

an output gear rotatably supported on said output shaft and having a first speed gear meshed with said first input gear and a second speed gear meshed with said second input gear;

a first transfer gear meshed with said second speed gear;

a second transfer gear;

a third transfer gear fixed to said output shaft and meshed with said second transfer gear;

a first clutch for selectively coupling said first transfer gear for rotation with said second transfer gear to establish a first power flow path between said output gear and said output shaft;

a second clutch for selectively coupling said output gear for rotation with said output shaft to establish a second power flow path therebetween; and a third clutch for selectively coupling said first input gear for rotation with said input shaft to cause said output shaft to be driven by said input shaft at a first speed ratio when said first power flow path is established and at a second speed ratio when said second power flow path is established, said third clutch is further operable for selectively coupling said second input gear for rotation with said input shaft to cause said output shaft to be driven at a third speed ratio when said first power flow path is established and at a fourth speed ratio when said second power flow path is established.

19. The manual transmission of claim 18 further comprising a differential driven by said output shaft.

20. A manual transmission comprising:

an input shaft;

an output shaft;

an intermediate shaft;

first and second input gears rotatably supported on said input shaft;

an output gear rotatably supported on said output shaft and having a first speed gear meshed with said first input gear and a second speed gear meshed with said second input gear;

a first transfer gear fixed to said intermediate shaft and meshed with said second speed gear;

a second transfer gear fixed to said intermediate shaft;

a third transfer gear rotatably supported on said output shaft and meshed with said second transfer gear;

a first clutch operable for selectively coupling said third transfer gear for rotation with said output shaft to establish a first power flow path between said output gear and said output shaft, and said first clutch is operable for selectively coupling said output gear for rotation with said output shaft to establish a second power flow path therebetween; and a second clutch for selectively coupling said first input gear for rotation with said input shaft to cause said output shaft to be driven by said input shaft at a first speed ratio when said first power flow path is established and at a second speed ratio when said second power flow path is established, said second clutch is further operable for selectively coupling said second input gear for rotation with said input shaft to cause said output shaft to be driven at a third speed ratio when said first power flow path is established and at a fourth speed ratio when said second power flow path is established.

21. The manual transmission of claim 20 further comprising a differential driven by said output shaft.

* * * * *